July 24, 1962

K. F. ROSS 3,046,330

PROJECTION OF STEREOSCOPIC PICTURES

Filed Oct. 7, 1957

INVENTOR
KARL F. ROSS

July 24, 1962 K. F. ROSS 3,046,330
PROJECTION OF STEREOSCOPIC PICTURES
Filed Oct. 7, 1957 6 Sheets-Sheet 2

INVENTOR
KARL F. ROSS

July 24, 1962 K. F. ROSS 3,046,330
PROJECTION OF STEREOSCOPIC PICTURES
Filed Oct. 7, 1957 6 Sheets-Sheet 3
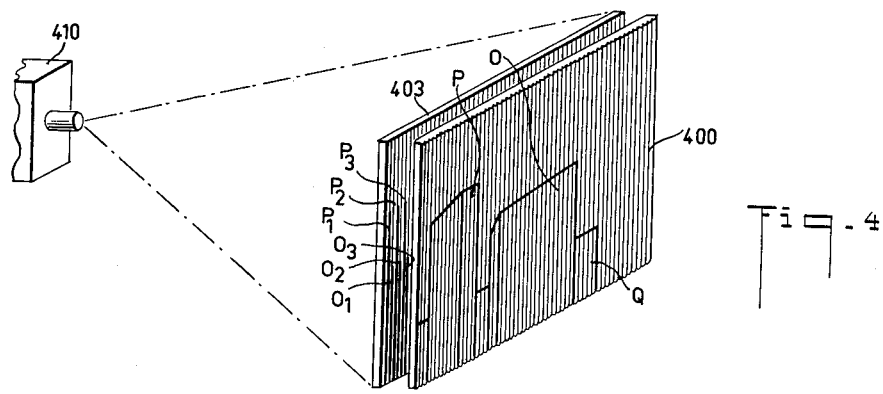
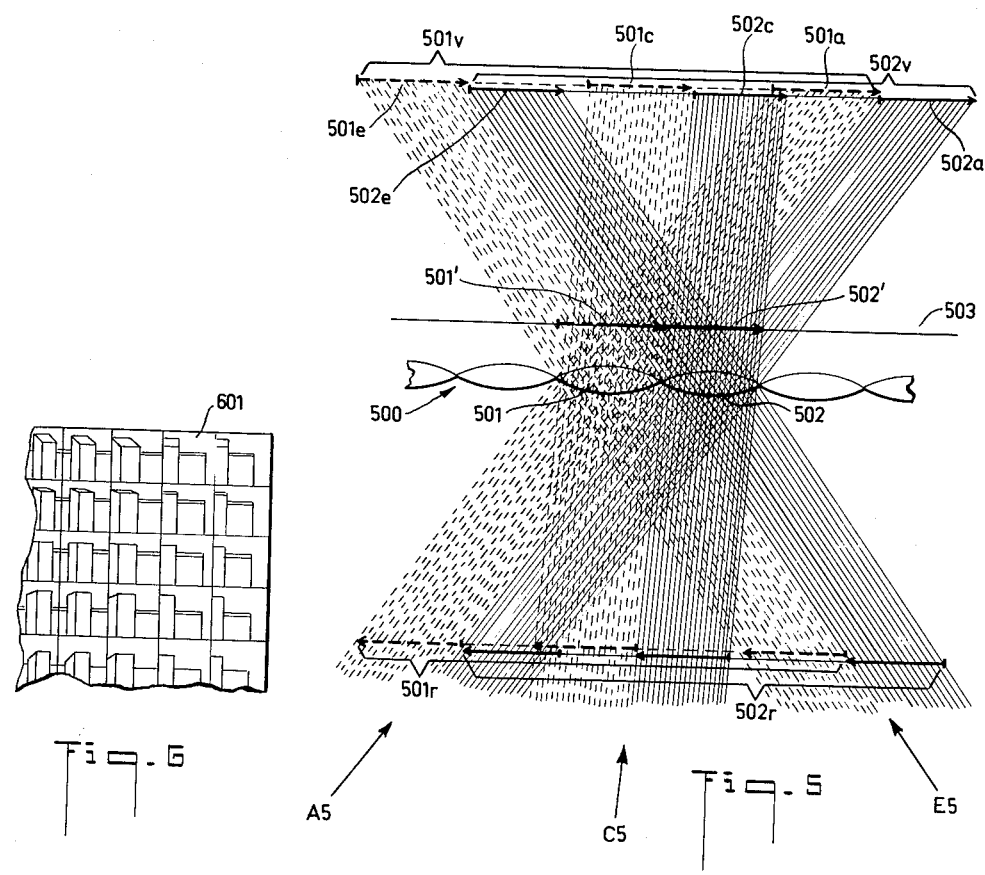
INVENTOR
KARL F. ROSS

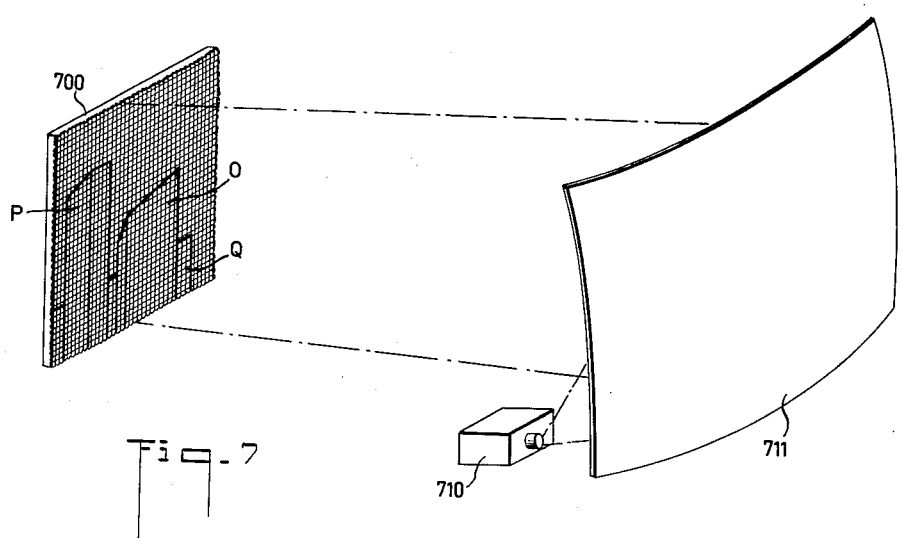
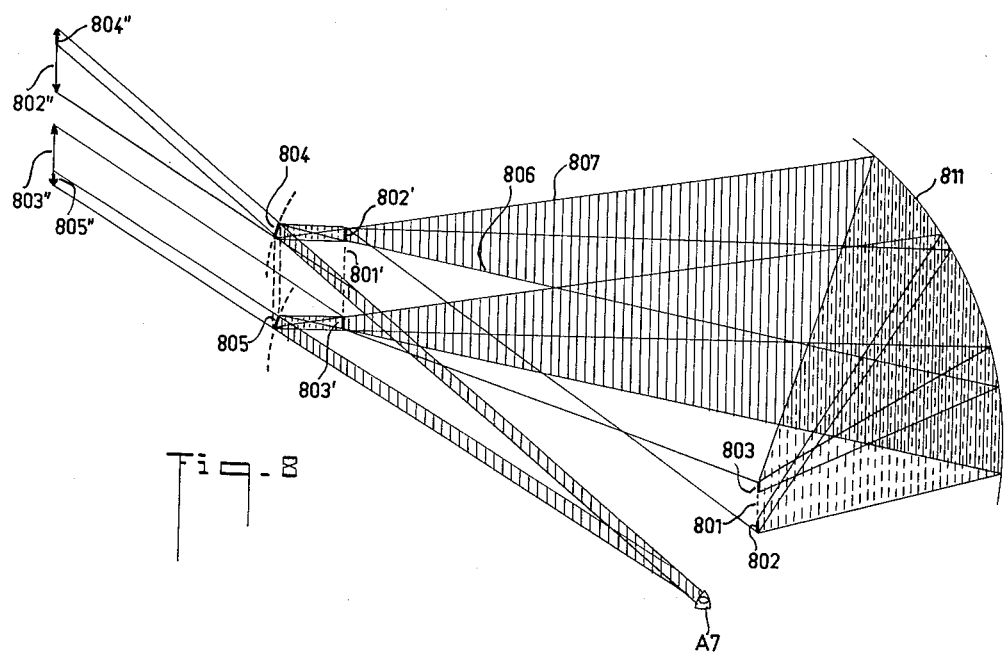

July 24, 1962  K. F. ROSS  3,046,330
PROJECTION OF STEREOSCOPIC PICTURES
Filed Oct. 7, 1957  6 Sheets-Sheet 5
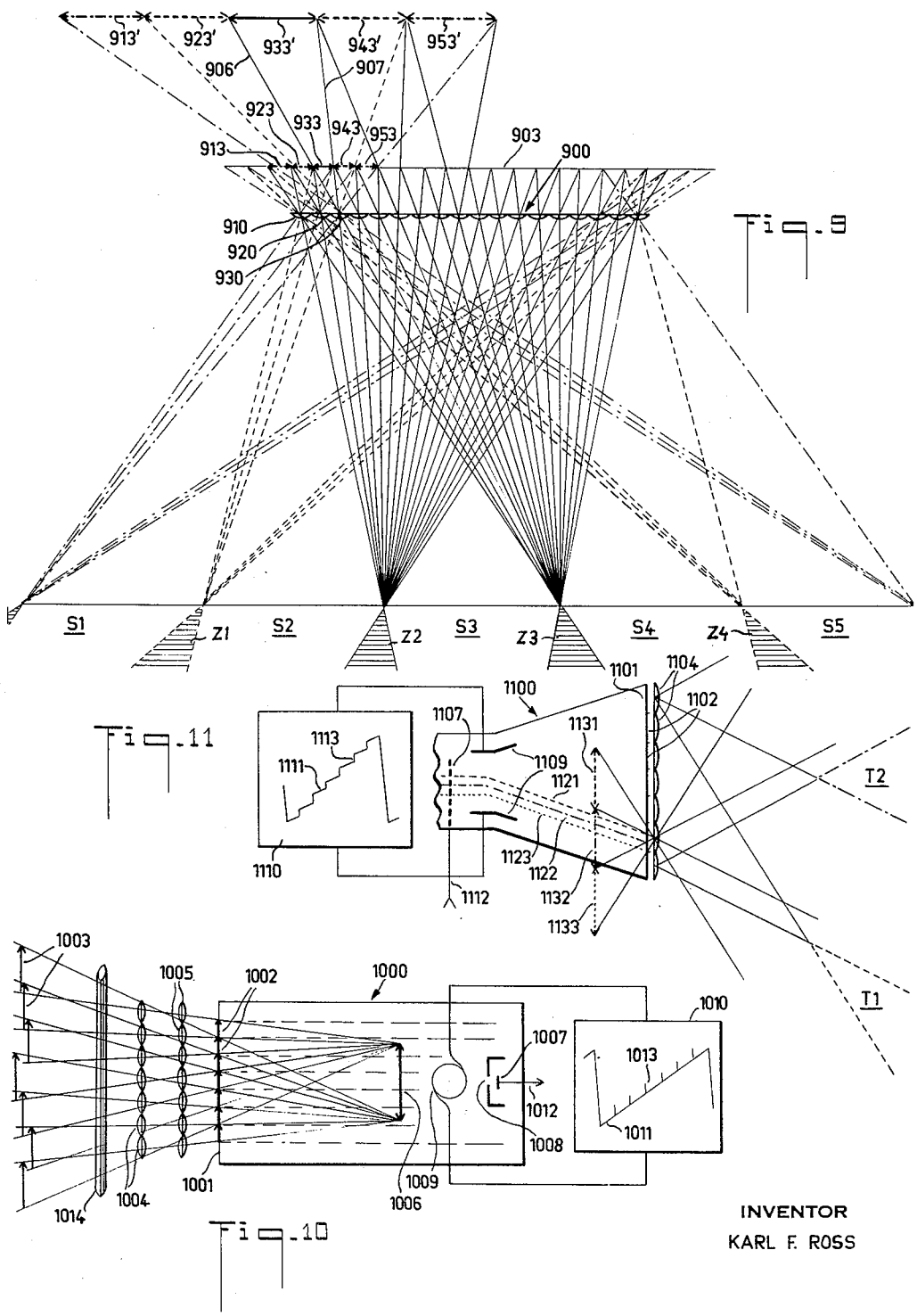
INVENTOR
KARL F. ROSS

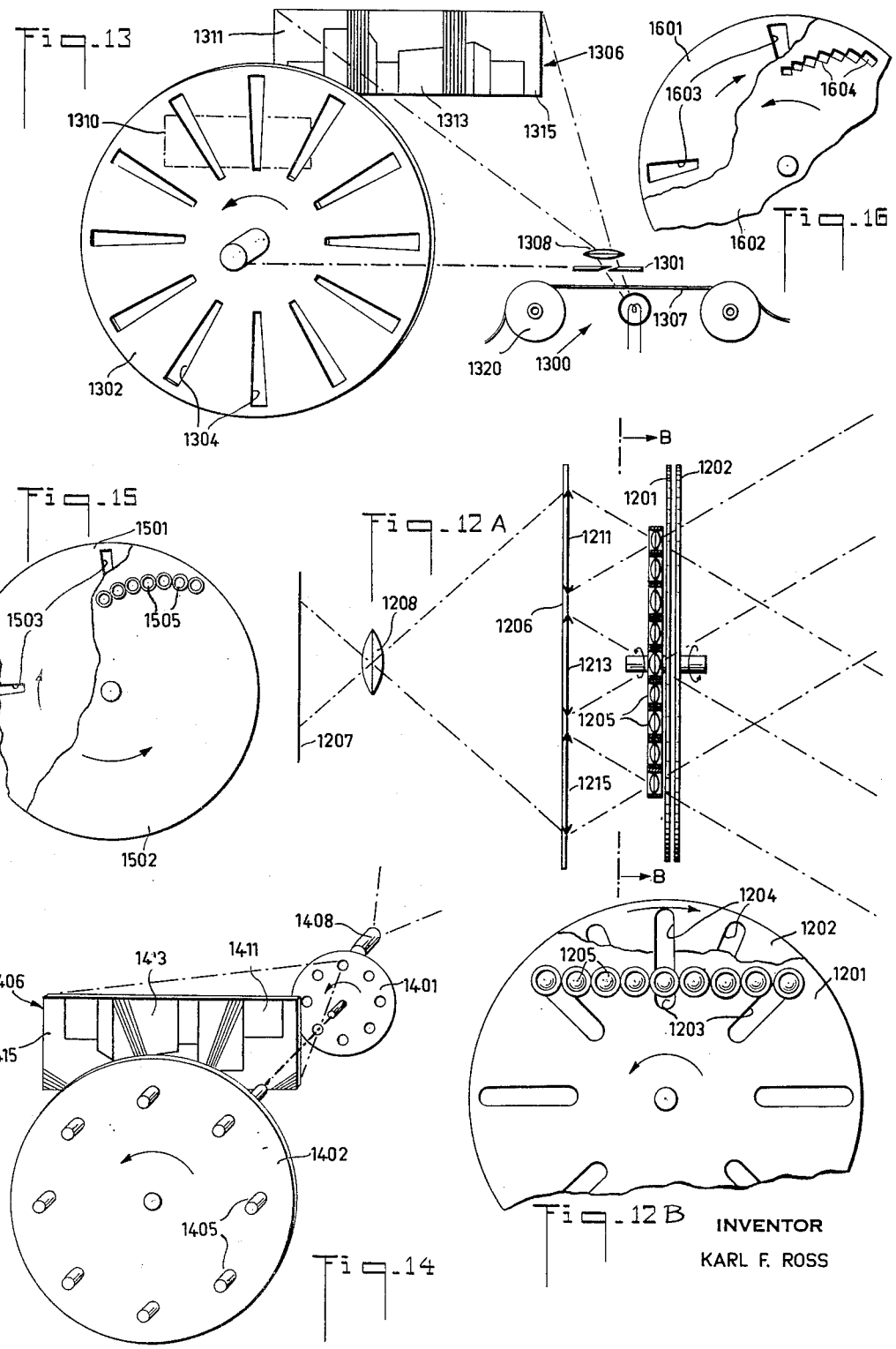

3,046,330
PROJECTION OF STEREOSCOPIC PICTURES
Karl F. Ross, 5121 Post Road, Riverdale, N.Y.
Filed Oct. 7, 1957, Ser. No. 688,566
4 Claims. (Cl. 178—6.5)

My present invention relates to a system for projecting pictures in such manner as to give a viewer the impression of observing a scene in three dimensions.

A person looking upon a scene perceives depth in several ways. These include the subconscious evaluation of the different aspects angles as between the images formed on the retina of the right and the left eye as well as the observation of the difference in speed with which stationary objects at shorter and longer distances from the observer seem to follow a movement of the head in the horizontal and/or the vertical dimension. Thus, a person walking from left to right across a landscape may see a certain tree first on the right and then on the left of a remote tower, thereby determining that the distance to the tower is greater than that to the tree. We may term this latter type of depth perception "motion stereoscopy" as distinguished from the "binocular stereoscopy" resulting from simultaneous viewing with both eyes.

Prior projection systems designed to give the illusion of three-dimensional vision have generally been based upon the principle of binocular stereoscopy, utilizing the simultaneous or rapidly alternating projection of two different images taken of the same scene or object at different angles of view. The observer, in order to be able to channel the two images separately into his right and his left eye, had to be fitted with special devices such as filters (color or polarization) or alternately opening shutters properly synchronized with the projection apparatus. Even so, the viewer could never gain the perfect impression of looking at a live scene since changes in the position of his eyes were not accompanied by corresponding shifts in the relative location of objects such as one experiences in nature.

My invention has for its principal object the provision of a method of and means for producing stereoscopic pictures without requiring the viewer to wear special filters, shutters or the like. A more specific object is to provide a system adapted to give, at least to a limited extent, the impression of motion stereoscopy as defined above.

Ideally, a truly stereoscopic picture projected upon, say, the screen of a motion-picture theater would have to fulfill the requirement that the objects appear in a different absolute and relative position from every point of the auditorium, exactly as would be the case if the screen were replaced by a window opening onto a live stage. This, of course, would require the simultaneous or virtually simultaneous projection of an infinite number of images each taken from a different observation point. In practice, a finite number of such images will suffice to create an illusion of continuity, even as a finite number of picture elements are satisfactory for television transmission. There remains, then, the problem of so projecting these images that each of them will be visible only to an observing eye located at a predetermined point or narrow sector of the auditorium corresponding to the location of a pickup point at which the respective picture had been taken.

The invention solves this problem broadly in the following manner: First, a plurality of pictures are taken, from a series of different vantage points, of a scene to be reproduced or of a given portion of such scene. Next, a viewing area in front of one or more observers is divided into a plurality of contiguous passages corresponding in number and geometrical array (though not necessarily in absolute center-to-center spacing) to the aforementioned vantage points, the width of these passages in at least one dimension (generally the horizontal one) being substantially less than the spacing of the human eyes (a distance of about 6 cm., hereinafter referred to as eye distance). Then, the several pictures are converted into images whose width in at least said one (horizontal) dimension is a multiple of the width of the aforesaid passages, whereupon light rays from each image are channeled toward the observers through the corresponding passage whereby each observer will see through each passage only a small portion of a respective image, the total picture seen through all the passages being a composite of such portions which is different for each observer position. As a result, the two eyes of an observer (or the eyes of different observers) will see different portions of the same image when trained upon the same point of the viewing area, i.e. upon the same passage, and will see corresponding portions of slightly different images when trained upon adjacent passages. Thus, to recall the illustration previously given, while the left eye may see at one passage the right-hand edge of the tree in alignment with the left-hand edge of the distant tower, the right eye will see at the same passage only a part of the tree and no trace of the tower; this right eye will find the right-hand edge of the tree at another passage to the right of the first one and will find the left-hand edge of the tower at a third passage still further to the right. It is interesting to note, in this connection, that the observer may focus his attention on either the close object (tree) or the remote object (tower) by varying the angle of convergence of the optical axes of his eyes, the same as in the actual viewing of three-dimensional scenery.

The channeling of the light rays from a particular image into a single passage may be accomplished by various means. According to one aspect of the invention, the images are projected consecutively, at a rate sufficiently rapid to make them seem to exist simultaneously, upon a receiving surface in overlapping positions so as to be in line with their respective passages. At the same time these passages, which in this case may simply be holes or slots in an opaque member, are selectively blocked and unblocked at the rate of image position so that the rays from each of the overlapping images find only one passage open. According to another aspect of the invention, the passages are constituted by reflective or refractive optical elements such as lenses or mirrors, of cylindrical or spherical configuration depending on whether only horizontal or both horizontal and vertical stereoscopy is desired, and the several pictures are initially compressed into areas respectively registering with these elements; the latter are so positioned as to produce magnified images of these pictures. In view of the fact that an observer can only see so much of an image (real or virtual) produced by a lens or a mirror as is in line with such lens or mirror, these focal elements constitute, in effect, optical passages analogous to those represented by the holes or slots described above.

The invention will be better understood from the following detailed description given with reference to the accompanying drawing in which:

FIG. 4 is a diagrammatic perspective view of a projector adapted to reproduce stereoscopic images in accordance with the invention;

FIG. 5 is a diagram useful for the understanding of the invention with particular reference to the operation of a projector as shown in FIG. 4;

FIG. 6 shows part of a modified projection screen for a reproduction system according to the invention;

FIG. 7 perspectively illustrates a further modification of a reproduction system according to the invention;

FIG. 8 is a diagram useful for the understanding of the mode of operation of the system of FIG. 7;

FIG. 9 is a diagram serving to illustrate a further modified form of projection systems according to the invention;

FIG. 10 diagrammatically illustrates a television pick-up tube embodying the principles of the invention;

FIG. 11 diagrammatically illustrates a television receiver correlated with the pick-up tube of FIG. 10;

FIG. 12A is a top plan view of an embodiment of a cinematographic recording system according to the invention using slotted light-channeling members;

FIG. 12B is an elevational view taken on the line B—B of FIG. 12A;

FIG. 13 is a perspective, partly diagrammatic view of a reproducing system correlated with the apparatus of FIGS. 12A and 12B;

FIG. 14 is a perspective view of a modified recording system adapted to be used in conjunction with a reproducing system similar to that of FIG. 13;

FIG. 15 is an elevational view of the light-channeling members of a recording system representing a further modification; and FIG. 16 shows part of a reproducing system correlated with the system of FIG. 15.

Figure 1:
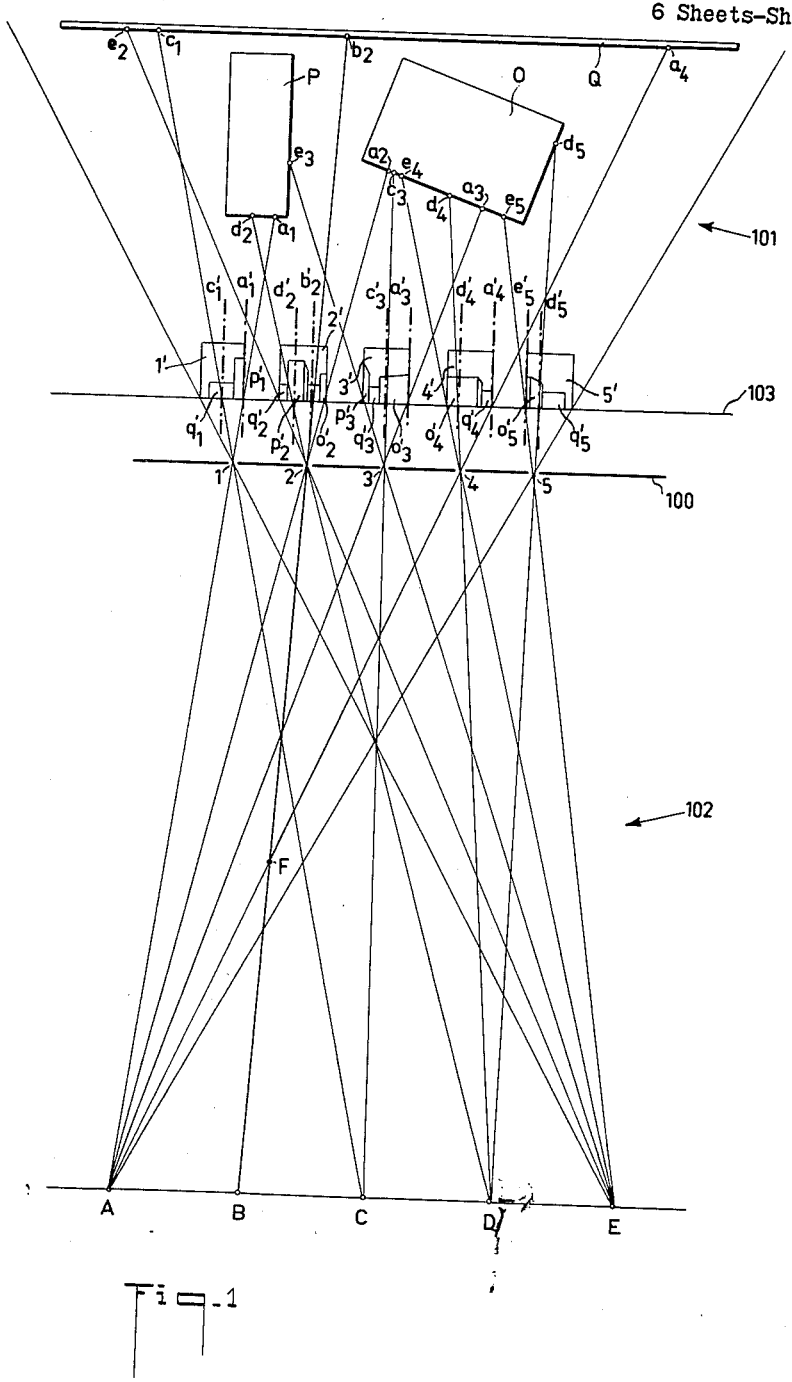
FIG. 1 is a diagrammatic top plan view of the stage and auditorium portions of a theater.

In FIG. 1 it has been assumed that a stage 101 is separated from the auditorium 102 of a theater by a curtain 100. On the stage there are shown three objects O, P and Q. Objects O and P are prismatic blocks, e.g. houses of different height, positioned in front of the elongated, substantially lower object Q (which may be a low wall or fence).

In the auditorium 102 there have been indicated six points A to F each representing the location of an observing eye. To facilitate an analysis of the manner in which rays from the objects O, P and Q converge at each of these observer positions, we shall assume that curtain 100 has been pierced by five narrow vertical slots designated 1, 2, 3, 4 and 5. These slots are so spaced that each observer will be able to glimpse through them portions of at least the central region of stage 101 including major parts of objects O and P.

At $a_1$, $a_2$, $a_3$, $a_4$ I have indicated the narrow zones of objects O, P and Q which observer A will see by way of slots 1–4; no part of the scenery will appear to this observer through slot 5. Similar zones appearing to observer E through slots 2, 3, 4 and 5 have been designated $e_2$, $e_3$, $e_4$ and $e_5$. At $b_2$ there has been shown a zone of object Q as seen by observer B through slot 2; in analogous manner, $c_1$ and $c_3$ designate zones seen by spectator C through slots 1 and 3, respectively, while zones $d_2$, $d_4$ and $d_5$ appear to observer D through the corresponding slots 2, 4 and 5.

It will thus be apparent that each one of the observing eyes A to E (of which, in the case of a miniature theater, any two may be assumed to belong to a single spectator) will see the scene 101 as a series of discontinuous vertical strips corresponding in number to the slots (here five) in curtain 100. The same applies to an observer positioned forwardly or rearwardly of the row A to E, such as observer F; the latter, in the position illustrated, will share for example the zone $b_2$ with observer B and the zone $a_4$ with observer A. As the number of slots increases, these strips or zones move closer together until, in the limiting case corresponding to complete removal of curtain 100, the continuous picture is seen.

Since each zone $a_1$, $a_2$ etc. is visible to only one eye of a spectator and, moreover, disappears from view as soon as this spectator moves laterally (e.g. from A to B), these zones taken by themselves do not give any impression of depth. Thus, each such zone may be replaced, so far as its appearance to the observer is concerned, by its own projection, in a vertical plane which includes the corresponding slot 1 to 5, upon a vertical plane 103 located rearwardly of and parallel to curtain 100. Some of these projected zones, rotated into the plane of the paper, have been shown at $a_1'$ to $a_4'$, $b_2'$, $c_1'$, $c_3'$, $d_2'$, $d_4'$, $d_5'$ and $e_5'$. If this process is repeated for an infinite number of zones, corresponding to an infinite number of observing eyes arrayed along the line A to E, then one obtains for each of slots 1 to 5 a composite projected picture shown respectively at 1' to 5'. The appearance of objects O, P and Q in these projected pictures has been indicated at $o_2'$ to $o_5'$, $p_1'$ to $p_3'$ and $q_1'$ to $q_5'$.

The number of slots 1 to 5, the spacing of these slots and the position of plane 103 have been so chosen that the projected pictures 1' to 5' will not overlap. Under these circumstances the positioning of the flat pictures 1' to 5' behind slots 1 to 5 will substantially duplicate the presence of the objects O, P and Q at the location illustrated, to the extent of their visibility to the observers, except for some dimensional distortion as between, say, observers B and F which can be minimized if the spacing between these observers is small compared with their distance from curtain 100. An examination of pictures 1' to 5' will further reveal that they correspond to photographic pictures taken of scene 101, at suitable angles, from locations corresponding to slots 1 to 5 respectively.

The need for avoiding overlapping prevents the use of curtain slots sufficiently numerous and close together to give the appearance of a continuous scene which could otherwise be composed from a large enough number of individual flat pictures positioned in or projected upon the plane 103. This difficulty can be avoided, in accordance with a feature of the invention, by the substitution of narrow cylindrical lenses (or lens combinations) for the slots 1 to 5, arrayed substantially without mutual separation in front of a like number of plane pictures each having a width substantially not greater than that of the corresponding lens, the spacing between picture and lens being such as to form a magnified image of which only a portion will be visible to each observer. This has been illustrated schematically in FIG. 5.

At 500 in FIG. 5 there has been shown a planar array of cylindrical collective lenses of which two have been designated 501 and 502. Upon a receiving surface 503, such as a groundglass screen, are projected a series of contiguous pictures of which only the pictures 501' and 502', respectively aligned with lenses 501 and 502, have been indicated. Given proper refractivity, lens 501 will produce of picture 501' a magnified virtual image 501v or a magnified real image 501r, depending upon the positioning of plane 503 relative to its focal point. Lens 502, similarly, will produce of picture 502' either a magnified virtual image 502v or a magnified real image 502r.

Arrows A5, C5 and E5 indicate the direction of view from three observers (A, C and E) looking toward plane 503 through the refractive array 500. Since each lens of the array effectively acts as a gate for the light rays comparable to the slots 1 to 5 of FIG. 1, each of these observers will see only a fraction of the magnified image produced by each lens. Thus (considering only the virtual images 501v and 502v), observer A will see image portion 501a through lens 501 and image portion 502a through lens 502; observer C will see image portion 501c through lens 501 and image portion 502c through lens 502; and observer E will see through these lenses the image portions 501e and 502e respectively. With suitable choice of lens widths and magnification ratio, the image portions seen by adjacent observers (which term is intended to include the two eyes of the same spectator) can be made non-overlapping.

If we consider the observers A and C as respectively the right and the left eye of a spectator and if we assume the width of each lens 501, 502 etc. to be appreciably less (e.g. about 3 cm.) than eye distance, then it will be readily apparent that the composite picture on receiving surface 503 will be resolved into a multiplicity of fractional components which together, when enlarged by the array 500, add up to a new composite 501a, 502a etc. or 501c, 502c etc. individual to each eye so that such spectator sees two distinct pictures at the same time. Moreover, these pictures vary as the spectator changes his position, as by moving to the right in FIG. 5 so that his left and his right eye now coincide with the observers C and E, respectively. In the latter position the picture seen by his right eye will be the composite 501e, 502e etc. while his left eye will now behold the composite 501c, 502c etc. previously viewed by the right eye.

A comparison of the virtual image 501v with the real image 501r in FIG. 5 will show that the components (501a, 501c, 501e) thereof associated with individual observers follow one another in the same order in both images but that the virtual and the real components are relatively inverted (as indicated by the positions of the arrows representing these components), with the result that images 501v, 502v etc. will be distorted versions of picture 501', 502' etc. Unless the width of each image component (and, therefore, that of each picture 501', 502' etc. as well as that of each lens in the array 500) is so small a fraction of the width of image 501r, 502r etc. that this inversion is not apparent to a viewer, it will be necessary individually to re-invert each image component if the spacing of plane 503 from array 500 is so chosen that real rather than virtual images of the pictures 501', 502' are produced by the respective lenses 501, 502 etc. This can be accomplished by a series of individual lenses in the ray paths of either the taking or the reproduction apparatus, similar to the lenses 1004 or 1005 of FIG. 10.

Figure 2:
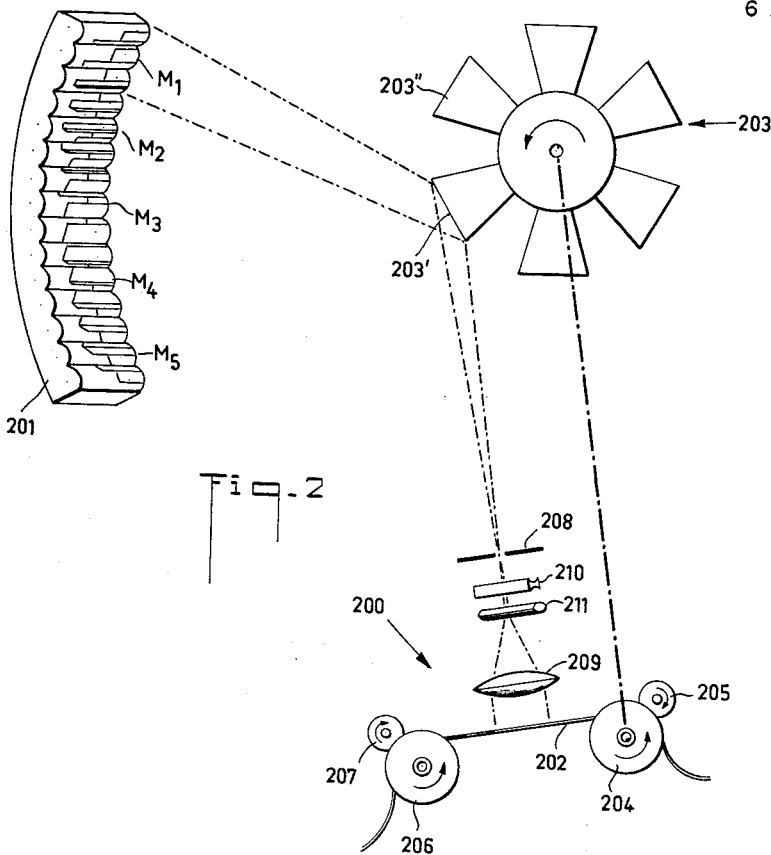
FIG. 2 is a diagrammatic view of a cinematographic recording apparatus for taking pictures for stereoscopic reproduction in accordance with the invention.

Reference will now be made to FIG. 2 for a description of an apparatus for the taking of composite pictures, also known as parallax panoramagrams, such as the one represented by surface 503 in FIG. 5. The principal parts of this apparatus are a motion-picture camera, schematically illustrated at 200, and a reflecting structure 201 comprising a multiplicity of cylindrically convex mirrors. Although only fifteen such mirrors have been shown, it is to be understood that in actual practice their number may be much larger (e.g. several hundred). It has been assumed that the reflector 201 is trained upon a scene similar to that shown at 101 in FIG. 1 and that the five mirrors specifically indicated at $M_1$, $M_2$, $M_3$, $M_4$, $M_5$ are positioned at locations respectively corresponding to the slots 1–5 in curtain 100, thus the images reflected by these mirrors toward the camera 200 correspond to the pictures 1'–5' as seen from these slots. The remaining mirrors show images as seen from locations between and beyond said slots.

It is, of course possible to let the camera 200 photograph simultaneously all the images appearing on the mirrors of reflector 201, thereby producing on each frame of the film 202 a composite image directly convertible into the composite picture 501', 502' etc. of FIG. 5. This, however, may involve an excessive compression of the component images from the individual mirrors $M_1$ etc. unless a film of extraordinary width is used. To avoid this inconvenience, there may be provided a rotary distributor 203 synchronized with the camera shutter (not shown) and with the film-feed mechanism, symbolized by rollers 204, 205 and 206, 207, for the purpose of projecting the images from different groups of mirrors upon successive frames. In the specific example illustrated, the distributor 203 comprises six reflecting surfaces 203', 203'' etc. each rotating through an angle of 60° during an interval of the order of $\frac{1}{20}$ of a second during which the shutter is momentarily opened five times. Thus the reflecting surface 203', taking in three mirrors at a time, scans the structure 201 in the course of five successive frames whereupon the cycle is repeated by the next reflecting surface 203''. At the reproducing apparatus, through an analogous distributor arrangement, the successive frames of the developed film are sequentially projected upon the receiving surface 503 to create thereon the entire composite picture or parallax panoramagram 501', 502' etc. corresponding to the totality of the strip images reflected by the mirrors of unit 201.

The camera 200 is also shown to comprise a diaphragm 208, serving to cut off unwanted light rays from the distributor 203, and an objective diagrammatically illustrated as composed of a centrally symmetrical lens 209 and a pair of cylindrical lenses 210, 211 which, by their relative displacement, enable the adjustment of the anamorphotic ratio of the projected images.

Figure 3:
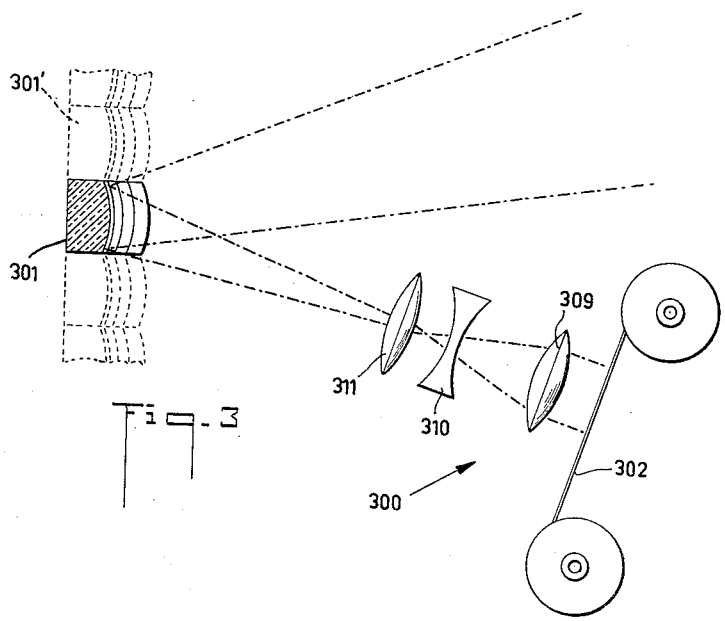
FIG. 3 is a diagrammatic view of a modified form of recording apparatus according to the invention.

In FIG. 3 I have shown a modified pick-up system in which a reflector 301 comprises a multiplicity of spherically convex mirrors in lieu of the cylindrical mirrors of FIG. 2. A desired ratio of width to length of the images projected upon film 302 is obtained through suitable adjustment of afocal cylindrical lens members 310, 311 and centrally symmetrical lens 309. It will be understood that, if desired, a distributor as shown in FIG. 2 may also be interposed between the reflector 301 and the camera 300 of FIG. 3.

FIG. 4 shows a projector 410 arranged to produce on a receiving surface 403, such as a ground-glass plate, a composite picture as previously described in connection with FIG. 5. An array 400 of cylindrical lenses, corresponding to the refractive array 500 of FIG. 5, is positioned in front of plate 403 to convert the component pictures thereof into a composite image as it appears to a particular observer. On this composite image there can be seen the objects O, P, and Q of FIG. 1, these objects also occurring repetitively in the composite picture on plage 403 as indicated at $O_1$, $O_2$, $O_3$ and $P_1$, $P_2$, $P_3$.

If a two-dimensional array of spherical mirrors is used at the picture-taking apparatus, as shown (dot-dash lines) at 301' in FIG. 3, the composite picture produced on the film and reproduced on the receiving surface 403 will have the form illustrated at 601 in FIG. 6. In that case it will, of course, be necessary to replace the cylindrical lenses of refractive array 400 by spherical lenses each coextensive with a respective component picture of the composite 601.

It may be mentioned that the picture 601 may also be a still photograph which, when placed behind a two-dimensional refractive array as described above, will give to a viewer the impression of a live scene seen through a window. The composite 601 may likewise be produced, by dint of painstaking labor, by an artist using paint or pencil to create an imaginary scene in three-dimensional presentation.

In FIG. 7 I have illustrated a system for the reproduction of stereoscopic images by means of an array of reflecting, rather than refracting, optical elements. A projector 701 converts a transparent composite picture, similar to the one shown at 601 in FIG. 6, into a beam of light rays which are reflected by a spherically concave mirror 711 toward a two-dimensional array 700 of spherically concave reflecting elements. To an observer there will again appear on the array 700 an image of the objects O, P and Q whose aspect varies with the observer's position. This will be explained with reference to FIG. 8.

In FIG. 8 I have indicated at 801 the composite picture recorded on the film of the projector. Two individual component pictures, spaced vertically from each other, have been designated 802 and 803, respectively. The light rays from composite 801, upon being reflected by the mirror 811, converge at 801' to form a real image 802' and 803' of components 802 and 803, respectively. These images are so located in front of two spherical reflecting elements 805, forming part of the array 700 in FIG. 7, as to transform them into magnified virtual images 802″ and 803″. An observer A7, in looking toward the reflecting array, will see of image 802″ only the portion 804″ directly in line with element 804 and will similarly see of image 803″ only the portion 805″ in line with element 805. Thus, as in the arrangement of FIG. 5, each observer will individually see a composite image including a respective section of each of a multiplicity of magnified images as defined by the alignment of the observer position with respective focusing zones (here represented by the reflectors 804, 805) through which the light rays forming said images must pass.

To insure satisfactory reproduction, it is necessary not only that each component image 802′, 803′ accurately register with a respective reflecting element 804, 805 but also that the limiting light rays of each image, such as those indicated at 806 and 807, be actually in existence; this requires a suitable dimensioning of the primary reflector 811 as will be apparent from FIG. 8.

In the systems hereinbefore described, every observer in the audience sees a picture different from that viewed by all the others. This, however, will not always be necessary; in many cases it will be convenient to divide the audience into sections and to display a similar gamut of images to each section. This has been illustrated in FIG. 9 where the refractive array 900 and the receiving surface 903 correspond to the elements 500 and 503 of FIG. 5. Several of the lenses of the array 900 have been particularly indicated at 910, 920, 930. Also, some of the component pictures appearing on surface 903, together constituting a parallax panoramagram, have been designated 913 (dot-dash), 923 (dotted), 933 (solid), 943 (dotted) and 953 (dot-dash).

At 913′, 923′, 933′, 943′ and 953′ there have been indicated the virtual images produced by lens 930 from the strip pictures 913, 923, 933, 943 and 953, respectively. It will be seen that in the present case the field of view defined by the limiting rays of each component picture, such as the rays 906 and 907, encompasses only a fraction of the auditorium whereby the latter is effectively subdivided into sectors S1, S2, S3, S4, S5. Thus, different spectators seated in central sector S3 will see different parts of image 933′ through lens 930. Moreover, the spectators in sector S1, looking through lens 930, will see parts of image 953′; those in sector S2 will see sections of image 943′ by way of the same lens; and those in sectors S4 and S5 will see through it portions of images 923′ and 913′, respectively. On the other hand, an observer in any other sector would have to look through some lens other than lens 930 in order to see part of a magnified image of picture 933, such as the lenses 910 and 920 which are aligned with this particular picture for sectors S1 and S2, respectively. It will thus be apparent that a similar composite image will be seen by each of five observers positioned in corresponding locations in sectors S1–S5 but that different observers within each sector will see different images.

It should be noted that the several sectors are separated by zones Z1, Z2, Z3, Z4 in which some portions of the projected scene will be lost from view and which, therefore, should not contain any spectators' seats.

In FIGS. 10 and 11 I have illustrated the application of my invention to a television system. FIG. 10 is a top plan view of a conventional television pick-up tube 1000 upon whose photocathode 1001 there are projected a series of strip images 1002. These images are produced, from overlapping portions of a scene symbolized by arrows 1003, through an optical system shown schematically as including a horizontal cylindrical lens 1014 and two sets of vertical, cylindrical, inverting lenses 1004, 1005 taking the place of the reflectors 201, 301 in FIGS. 2 and 3. To insure proper correlation between the projected images 1002, their limiting rays should intersect as indicated by the extremities of arrow 1006. As the scene to be televised will generally be at a considerable distance from tube 1000, the overlap of the fields of view of adjacent lenses 1004, 1005 will be substantially greater than that of the arrows 1003.

The electron bundle emitted by the cathode 1001 is scanned by an output electrode 1007 behind an aperture 1008, horizontal scanning displacement being imparted to the electrons by a deflecting coil 1009 connected across a sweep circuit 1010 which produces a sawtooth sweep voltage 1011. The output signal on lead 1012 is transmitted, by conventional means, to the receiver shown in top plan view in FIG. 11 where it is applied to an input lead 1112 connected to a control grid 1107 of a cathode-ray tube 1100. The intensity of an electron stream emitted by an electron gun (not shown) of the usual construction is controlled by the grid 1107 as the electrons are deflected by a scanning circuit including horizontal deflecting plates 1109 and a sweep circuit 1110 whose output is synchronized with that of sweep source 1010. The vertical sweep circuit (not shown) of the tubes 1000 and 1100 is of conventional type.

By the arrangement so far described there would be produced on the fluorescent screen 1101 of tube 1100 a series of pictures 1102 corresponding to the strip images 1002 projected upon the screen 1001 of pick-up tube 1000. A set of lenses 1104, positioned in front of screen 1101 to register with the pictures 1101, would then present to different observers a diversity of composite images as has been described in connection with FIG. 5.

Taking into account the necessary magnification of the pictures 1101 by the lenses 1104, it would be necessary for adequate definition to multiply the number of picture elements and, therefore, the required bandwidth by the number of lenses which, in the case of a cylindrical array as shown, corresponds to the factor of linear magnification. This increase in bandwidth may be minimized if the system is modified to provide sectionalized stereoscopic viewing as has been described in connection with FIG. 9. For this purpose the electrons of tube 1100 are formed into a plurality of parallel beams 1121, 1122, 1123 all controlled by the grid 1107 and by the deflecting electrodes 1109. The sweep source 1110 is arranged to provide an output voltage in the form of a stepped sawtooth wave 1111 whose steep flanks 1113 occur under control of sharp synchronizing pulses 1013 (FIG. 10), the latter coming into existence whenever the aperture 1008 scans the transition between two images 1102. The spacing of pulses 1013 and the slope of wave 1111 between flanks 1113 is such that the group of electron beams 1121, 1122, 1123 will traverse, between steps, a distance corresponding to the spacing of these beams. The system then operates as follows:

During each scanning step, which in the embodiment illustrated represents one seventh of a cycle of sawtooth wave 1111, each beam produces on screen 1101 a luminous picture representing a compressed version of the corresponding strip image 1002 at the pick-up camera 100. The width of this compressed picture is $1/n$ times the width of each lens 1104, $n$ being the number of electron beams (here three). As a result, each picture 1102 is divided in the direction of line scan into three portions or image area whose magnified images, produced by the associated lens 1104, have been shown at 1131, 1132, 1133. Thus, each of these image areas is an upright rectangle whose height equals that of screen 1101 and whose width, with seven lenses, is 1/21 times the screen width. At the end of a scanning step, when the beam 1121 has reached the upper edge of a lens 1104 (as viewed in FIG. 11), the steep flank 1113 of the sweep voltage carries the three beams into the next operative position in which the beam 1123 is aligned with the lower edge of the next lens.

As a result of this arrangement, an observer in a sector T1 will view a composite image composed of portions of image sections 1131 and corresponding image sections from the remaining pictures 1102 which together constitute a parallax panoramagram; an observer in a sector T2 will view a composite image composed of portions of image sections corresponding to image section 1132 and together defining a like panoramagram; and an observer positioned in a third sector, not shown, will similarly look at parts of image sections corresponding to section 1133. Thus, as in the system of FIG. 9, observers similarly positioned in different sectors will see the same image but different observers in the same sector will see different images. The bandwidth-multiplication factor is $m/n$ where $m$ represents the number of lenses 1104.

In FIGS. 12A and 12B there is shown an apparatus for taking stereoscopic pictures with the aid of a pair of relatively rotatable, slotted disks 1201, 1202 of opaque material which serve as light-channeling means in lieu of the refractive or reflective arrays of the preceding embodiments. Disk 1201, rotating counterclockwise (as viewed in FIG. 12B) under the control of a driving mechanism not shown, is provided with a series of radial slots 1203; disk 1202, rotating in the opposite direction, has similar slots 1204 whose angular spacing has been shown as only half that of slots 1203. Behind the rear disk 1201, at the level of the slots, there is provided a stationary array of objectives 1205 adapted to photograph, through the registering slots 1203 and 1204, overlapping portions of a scene located in FIG. 12A to the right of the rotating unit 1201, 1202, the speeds of the disks and the spacing of their slots being so chosen that each objective 1205 becomes operative once during an opening cycle whose duration should be less than the period of visual retention of the human retina which is approximately $1/16$ of a second. In the image plane of these objectives there is positioned a ground-glass plate 1206 upon which the images formed by them are projected; these images are then photographed, on a film 1207, by the objective 1208 of a motion-picture camera so synchronized with the disks 1201, 1202 that a new frame of the film is aligned with the objective 1208 whenever a different objective or group of objectives 1205 becomes operative. In the embodiment illustrated, either two or three objectives 1205 operate simultaneously to project upon the plate 1206 a corresponding number of non-overlapping images such as those indicated at 1211, 1213, 1215. With this arrangement, using nine objectives 1205, there will be five frames per operating cycle; in practice, however, the number of such objectives will generally be much larger. While the disk 1201 is not essential to the operation of this system, its presence causes a symmetrical blocking and unblocking of the ray paths through each of the auxiliary objectives 1205.

It will be understood that the slots 1203, 1204 need not be physical voids but may comprise transparencies, such as glass plates. The same applies to the slots 1304 formed in a disk 1302 of the reproduction system of FIG. 13, the rotation of this disk being synchronized with the operation of film-feeding means 1320 and the shutter 1301 of a motion-picture projector 1300 whose lens 1308 projects the pictures on film 1307 upon a screen 1306.

Projector 1300 operates to flash upon screen 1306 a plurality of pictures 1311, 1313, 1315, corresponding to the images 1211, 1213, 1215 of FIG. 12A, whenever some of the slots 1304 are in an angular position, relative to screen 1306, corresponding to the angular position, relative to plate 1206, of those objectives 1205 by which the said images had been produced. Thus, in the course of one operating cycle as defined above, disk 1302 in conjunction with shutter 1301 scans the screen 1306 ever as the disks 1201 and 1202 at the recording apparatus scan the objectives 1205 during such cycle. It will be understood that the shutter 1301 may be replaced or supplemented by a second, oppositely rotating disk similar to disk 1201 and that, conversely, either or both of the disks in FIGS. 12A, 12B may be coupled with a camera shutter, e.g. as illustrated in FIG. 14.

It will be noted that the pictures 1311, 1313, 1315 are similar to the pictures 1', 3' and 5', respectively, of FIG. 1 and that the slots 1304 take the place of the curtain slots 1, 3 and 5 in regard to these pictures. The operation of the system of FIGS. 12A, 12B and 13 should, therefore, be readily understood from the theoretical explanations given in connection with FIG. 1. Since the slots 1304 are inclined to the vertical in each except a central position, there will be some distortion of the stereoscopic picture seen by an observer which, however, will be small if the apparent field of view (indicated in dot-dash lines at 1310) extends over a small angle of disk 1302.

In FIG. 14 a disk 1402 carries a set of angularly spaced objectives 1405 replacing the stationary objectives 1205 of FIGS. 12A and 12B. The images picked up by these objectives are projected upon a groundglass plate 1406, as illustrated at 1411, 1413 and 1415, in successive angular positions selected by a camera shutter 1401 which is positioned in front of camera objective 1408 and synchronized with the disk 1402. The pictures taken by the objective 1408 may again be reproduced on the apparatus of FIG. 13; the arcuate path of objectives 1405 may result in some curvature of the stereoscopic picture which may be minimized by making the radius of disk 1402 as large as possible.

FIG. 15 shows a modified scanner for a motion-picture recording apparatus comprising two oppositely rotating disks 1501 and 1502. Disk 1501 is provided with a series of angularly spaced slots 1503, slanted at a small angle with respect to the radial direction, and rotates clockwise at low speed; disk 1502 carries a set of objectives 1505, arrayed along a curved line within an annular zone registering with the slots 1503, and rotates counterclockwise at high speed. As the slot 1503 at the top of disk 1501 advances by a small angle, the rapidly moving objectives 1505 successively register with it so as effectively to scan an approximately radial or vertical line. After a nearly full rotation of disk 1502 the objectives 1505 encounter the same slot in a different angular position so as to scan another approximately radial line; owing to the provision of several slots 1503, a plurality of such lines are scanned in a single sweep even as a plurality of the slots 1203 operatively register with respective slots 1204 in FIG. 12B. Through proper choice of speeds it will thus be possible, with the arrangement of FIG. 15, to scan a scene in two dimensions and to enable the reproduction of a horizontally and vertically stereoscopic picture by complementary apparatus, such as the system of FIG. 13 in which the scanner 1302 has been replaced by a device as shown in FIG. 16.

The two-dimensional scanner of FIG. 16, complementary to that of FIG. 15, comprises a pair of disks 1601, 1602 rotating slowly clockwise and rapidly counterclockwise, respectively. Disk 1601 is formed with angularly spaced slots 1603 which are similar, in spacing and positioning, to the slots 1503 but increase in width toward the disk periphery. Disk 1602 is provided with a series of generally trapezoidal apertures 1604 whose positions correspond to those of objectives 1505 on disk 1502 and which may be regarded as portions of a disk sector relatively offset by a constant angle. Thus, the system of FIG. 16 will be capable of producing in front of a viewing screen, such as the screen 1306, a scanning sweep substantially identical with that produced by the system of FIG. 15 in front of a projection surface, such as the plate 1206 or 1406.

While I have described in detail a number of representative embodiments of my invention, I have not attempted to exhaust the many other modifications, substitutions and combinations which, in the light of this disclosure and of the theory developed herein, will readily occur to persons skilled in the art and which I intend to include in the scope of the invention as defined in the appended claims.

I claim:
1. A system for the televised reception of stereoscopic pictures, comprising a cathode-ray tube having a luminous screen horizontally subdivided into a row of image areas, beam-forming means in said tube producing a plurality of electron beams staggered in the horizontal direction by a distance equal to the width of an image area whereby said image areas are combined into groups each consisting of a number of image areas equal to the number of said beams, signal-responsive means controlling said beam-forming means in a manner displaying identical strip images on the image areas of each group and different strip images on the areas of different groups, said different strip images representing aspects of a given scene viewed from different angles and together constituting a parallax panoramagram, and a row of magnifying lenses each substantially co-extensive with a respective group of image areas, said lenses having their fields of vision substantially coincident over a predetermined viewing area, thereby directing light from each associated image area toward a respective sector of said viewing area.

2. A system for the production of stereoscopic pictures, comprising a receiving surface subdivided into a row of image areas, means for forming on said areas respective strip images, said image areas being divided into successive groups each having a plurality of identical images formed thereon, the images of each of said groups differing from those of any other group and representing aspects of a given scene viewed from different angles, the different images from all of said groups together constituting a parallax panoramagram, and a row of light-focusing elements extending parallel to said row of image areas, each of said elements being in light-receiving relationship with a respective group of image areas and in light-transmitting relationship with a number of viewing sectors corresponding to the number of image areas in the associated group, thereby directing light from each associated image area toward a respective viewing sector.

3. A system for the production of stereoscopic pictures, comprising a receiving surface subdivided into a row of image areas, means for forming on said areas respective strip images, said image areas being divided into successive groups each having a plurality of identical strip images formed thereon, the images of each of said groups differing from those of any other group and representing aspects of a given scene viewed from different angles, the different images from all of said groups together constituting a parallax panoramagram, and a row of magnifying lenses each operatively aligned with a respective group of image areas, said lenses having their fields of vision substantially coincident over a predetermined viewing area, thereby directing light from each associated image area toward a respective sector of said viewing area.

4. A system according to claim 3 wherein said receiving surface comprises a television screen.

References Cited in the file of this patent
UNITED STATES PATENTS

| | | |
|---|---|---|
| 1,851,705 | Herz | Mar. 29, 1932 |
| 1,957,745 | Wildhaber | May 8, 1934 |
| 1,960,011 | Ives | May 22, 1934 |
| 2,100,634 | Coffey | Nov. 30, 1937 |
| 2,107,464 | Zworykin | Feb. 8, 1938 |
| 2,550,350 | Henson | Apr. 24, 1951 |
| 2,701,503 | Calvi | Feb. 8, 1955 |
| 2,783,406 | Vanderhooft | Feb. 26, 1957 |
| 2,883,906 | Rehorn | Apr. 28, 1959 |